(12) United States Patent
Nygaard et al.

(10) Patent No.: US 11,099,119 B1
(45) Date of Patent: Aug. 24, 2021

(54) INSPECTION SYSTEM FOR MANUFACTURED COMPONENTS

(71) Applicant: General Inspection, LLC, Davisburg, MI (US)

(72) Inventors: Greg Nygaard, Clarkston, MI (US); Nathan Kujacznski, Swartz Creek, MI (US); Dikshant Sharma, Troy, MI (US)

(73) Assignee: General Inspection, LLC, Davisburg, MI (US)

( * ) Notice: Subject to any disclaimer, the term of this patent is extended or adjusted under 35 U.S.C. 154(b) by 0 days.

(21) Appl. No.: 16/940,928

(22) Filed: Jul. 28, 2020

(51) Int. Cl.
  *G01N 21/00* (2006.01)
  *G01N 21/01* (2006.01)
  *G01N 21/88* (2006.01)

(52) U.S. Cl.
  CPC ............. *G01N 21/01* (2013.01); *G01N 21/88* (2013.01); *G01N 2201/02* (2013.01)

(58) Field of Classification Search
  CPC ........... G01N 21/9501; G01N 21/8806; G01N 21/94; G01N 21/956; G01N 21/88

USPC ....................................................... 356/237.1
See application file for complete search history.

(56) References Cited

U.S. PATENT DOCUMENTS

| | | | |
|---|---|---|---|
| 7,931,388 B2 | 4/2011 | Kanpurwala et al. | |
| 9,575,013 B2 | 2/2017 | Nygaard et al. | |
| 10,545,096 B1 | 1/2020 | Putman et al. | |
| 2009/0163929 A1* | 6/2009 | Yeung | A61B 34/30 606/130 |
| 2019/0076199 A1* | 3/2019 | Kline | H04N 13/366 |

* cited by examiner

*Primary Examiner* — Md M Rahman
(74) *Attorney, Agent, or Firm* — Brooks Kushman P.C.

(57) ABSTRACT

An inspection system includes a base plate, an array of fixtures, a plurality of light sources, and a drive mechanism. Each fixture has a first portion rotatably secured to the base plate and configured to rotate about a yaw axis and a second portion rotatably secured to the first portion and configured to rotate about a pitch axis. Each light source is secured to one of the fixtures and is configured to direct light at yaw and pitch angles relative to the base plate. The drive mechanism is configured to rotate the first portions of each fixture about each respective yaw axis and to rotate the second portions of each fixture about each respective pitch axis to adjust yaw and pitch angles of each light source, respectively.

20 Claims, 6 Drawing Sheets

INSPECTION SYSTEM FOR MANUFACTURED COMPONENTS

TECHNICAL FIELD

The present disclosure relates to inspection systems for manufactured products or components.

BACKGROUND

Inspection systems may be utilized to detect defects in manufactured products during production of such manufactured products.

SUMMARY

An inspection system includes a base plate, an array of fixtures, a plurality of light sources, and a drive mechanism. The array of fixtures is arranged radially about a center of the base plate. Each fixture has a first portion rotatably secured to the base plate and configured to rotate about a yaw axis and a second portion rotatably secured to the first portion and configured to rotate about a pitch axis. Each light source is secured to one of the fixtures and is configured to direct light at a yaw angle about the yaw axis of the respective fixture relative to a center of the base plate and away from the base plate at a pitch angle about the pitch axis of the respective fixture relative to an outer surface of the base plate. The drive mechanism is configured to rotate the first portions of each fixture about each respective yaw axis to adjust the yaw angle at which each light source directs light relative to the center of the base plate and to rotate the second portions of each fixture about each respective pitch axis to adjust the pitch angle at which each light source directs light away from the base plate relative to the outer surface of the base plate.

An inspection system for manufactured components includes a ring-shaped base plate, an array of fixtures, a plurality of light sources, and a drive mechanism. The ring-shaped base plate defines a central opening and a plurality of orifices arranged radially about the central opening. Each fixture has a lower portion and an upper portion. The lower portion of each fixture has a first pivot shaft disposed within one orifice of the plurality of orifices such that the lower portion of each fixture is configured to rotate about a yaw axis. The upper portion of each fixture is rotatably secured to the lower portion via a second pivot shaft such that the lower portion rotates about a pitch axis. Each light source is secured to one of the fixtures and is configured to direct light at a yaw angle about the yaw axis of the respective fixture relative to the central opening and away from the ring-shaped base plate at a pitch angle about the pitch axis of the respective fixture relative to an upper surface of the ring-shaped base plate. The drive mechanism is configured to rotate the lower portions of each fixture about each respective yaw axis to adjust the yaw angle at which each light source directs light relative to the central opening, and to rotate the upper portions of each fixture about each respective pitch axis to adjust the pitch angle at which each light source directs light away from the ring-shaped base plate relative to the upper surface of the ring-shaped base plate.

An inspection system includes a base plate, a first array of fixtures, a second array of fixtures, a plurality of light sources, a plurality of cameras, and a drive mechanism. The first and second arrays of fixtures are interleaved relative to each other and are arranged radially about a center of the base plate. Each fixture of the first and second arrays of fixtures has a first portion rotatably secured to the base plate and configured to rotate about a yaw axis. Each fixture of the first and second arrays of fixtures has a second portion rotatably secured to the first portion and configured to rotate about a pitch axis. Each light source is secured to one of the fixtures of the first array of fixtures and is configured to direct light at a first yaw angle about the yaw axis of the respective fixture relative to a center of the base plate and away from the base plate at a first pitch angle about the pitch axis of the respective fixture relative to an outer surface of the base plate. Each camera is secured to one of the fixtures of the second array of fixtures and is directed at a second yaw angle about the yaw axis of the respective fixture relative to the center of the base plate and away from the base plate at a second pitch angle about the pitch axis of the respective fixture relative to the outer surface of the base plate. The drive mechanism is configured to rotate the first portions of each fixture of the first array of fixtures about each respective yaw axis to adjust the first yaw angle at which each light source directs light relative to the center of the base plate, rotate the second portions of each fixture of the first array of fixtures about each respective pitch axis to adjust the first pitch angle at which each light source directs light away from the base plate relative to the outer surface of the base plate, rotate the first portions of each fixture of the second array of fixtures about each respective yaw axis to adjust the second yaw angle at which each camera is directed relative to the center of the base plate, and rotate the second portions of each fixture of the second array of fixtures about each respective pitch axis to adjust the second pitch angle at which each camera is directed away from the base plate relative to the outer surface of the base plate.

DETAILED DESCRIPTION

Figure 1:
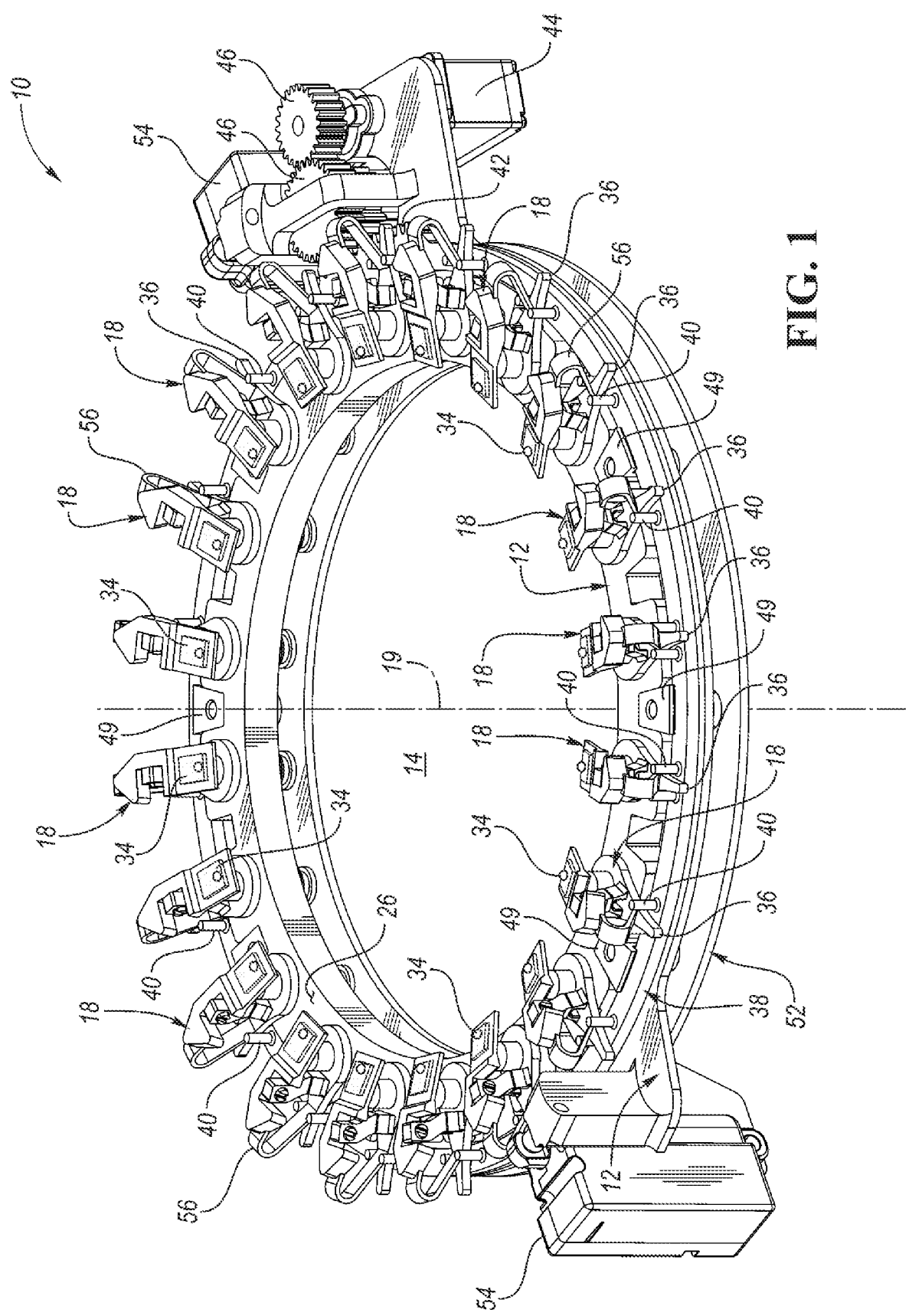
FIG. 1 is an isometric view of an inspection system for manufactured products or components.
Figure 2:
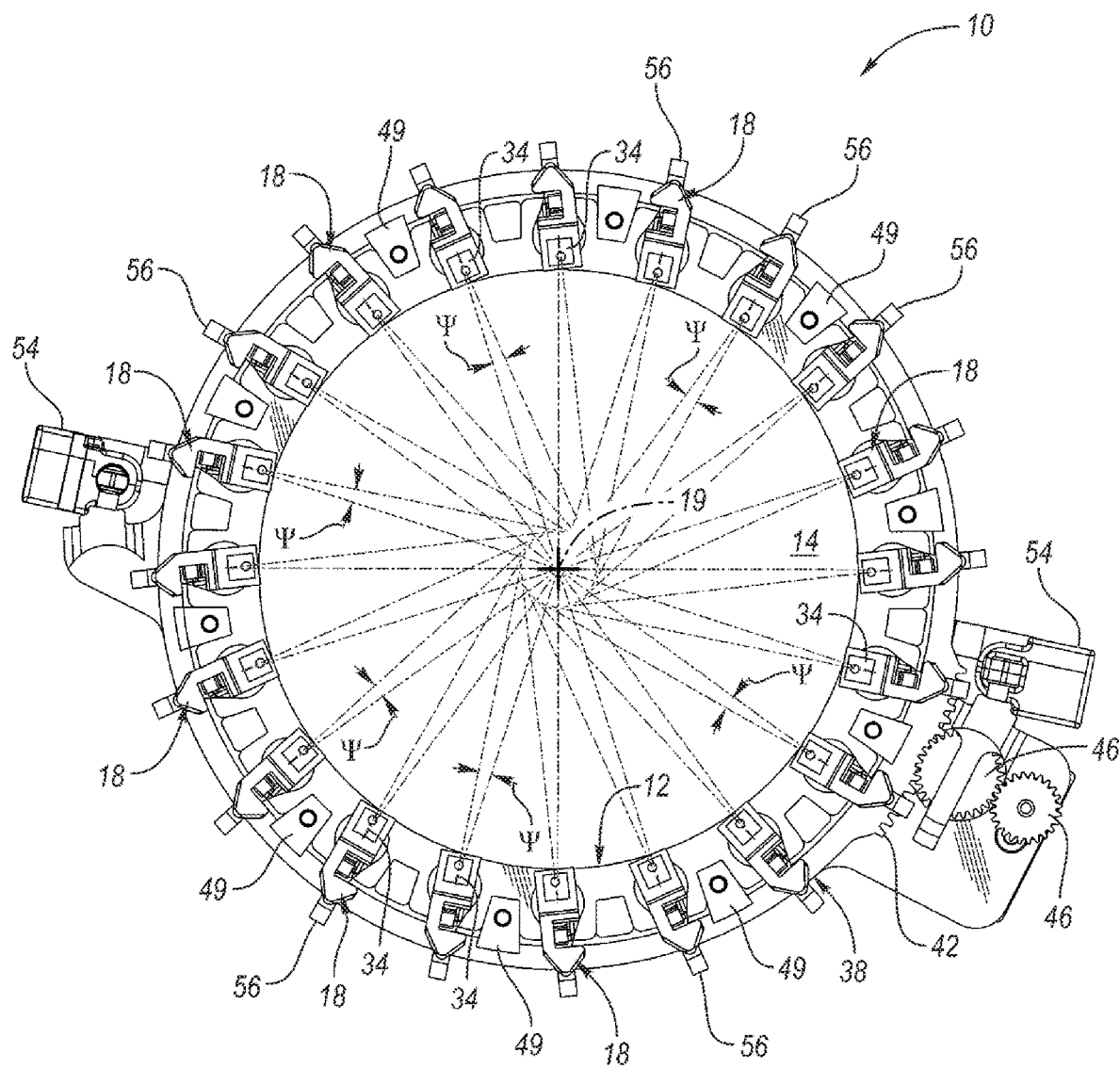
FIG. 2 is a top view of the inspection system for manufactured products or components.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring to FIGS. 1-6, an inspection system 10 for manufactured products or components is illustrated. The inspection system 10 is configured to inspect any manufactured component or product, including but not limited to, threaded bolts, rivets, nails, bottles, ammunition cartridges, or any other manufactured product. The inspection system 10 includes a plurality of light sources that are configured to illuminate a manufactured component or product and cameras that are configured to detect defects on the manufactured component or product. The positions of the light sources are configured to transition during the inspection in order to illuminate the manufactured component or product from a range of angles. More specifically, yaw and/or pitch angles at which the light sources direct light toward the manufactured component or product may perform a sweep over a range of yaw and/or pitch angles while inspecting the manufactured component or product in order to ensure that all defects are illuminated during the inspection process. Some defects may remain hidden if the light sources were to remain static and only oriented at single yaw and/or pitch angles during the inspection process. Therefore, performing a sweep of angles at which the light sources illuminate the manufactured component or product increases the probability that all defects will be exposed during the inspection process.

Defects may include any deviation beyond a tolerance from a desired dimension, geometry, or profile or any other defect of a manufactured component or product. For example, if the inspection station is being utilized to inspect ammunition cartridges, the defects may include any defect listed in military standard MIL-STD-636. Such defects include but are limited to, dents, splits, perforations, cracks, scratches, wrinkles, buckles, smudges, surface blemishes, etc. As another example, if the inspection station is being utilized to inspect threaded bolts, the defect may include a deviation from a desired threading geometry, a deviation in the diameter of the bolt head from a desired diameter, any other deviation of a dimension, geometry, or profile that is greater than a tolerance, or any defect described immediately above (i.e., dents, splits, perforations, cracks, scratches, wrinkles, buckles, smudges, surface blemishes, etc.). If the inspection station is being utilized to inspect any other manufactured products or components (e.g., a bottle, nail, rivet, etc.) the defect may include any deviation of a dimension, geometry, or profile that is greater than a tolerance or any of the defects described immediately above (i.e., dents, splits, perforations, cracks, scratches, wrinkles, buckles, smudges, surface blemishes, etc.).

The inspection system 10 includes a base plate 12. Please note the base plate 12 is shown as a cross-section in FIG. 5 for illustrative purposes. The base plate 12 may be a ring-shaped base plate that defines a central opening 14 and a plurality of orifices 16 that arranged radially about the central opening 14. The inspection system 10 includes an array of fixtures 18 that are arranged radially about a center 19 of the base plate 12 or radially about the central opening 14 defined by the base plate 12. Each fixture 18 has a first portion 20 that is rotatably secured to the base plate 12. The first portion 20 may also be referred to as the lower portion. The first portion 20 of each fixture 18 is configured to rotate about a yaw axis 22. More specifically, the first portion 20 of each fixture 18 may have a first pivot shaft 24 that is disposed and configured to rotate within one orifice 16 of the plurality of orifices defined by the base plate 12 such that the first portion 20 of each fixture 18 is configured to rotate about a respective yaw axis 22. Each yaw axis 22 that each respective first portion 20 of each fixture 18 is configured to rotate about may be substantially perpendicular to an outer or upper surface 26 of the base plate 12. Substantially perpendicular may refer to any incremental value between exactly perpendicular and 10° from exactly perpendicular.

Each fixture 18 has a second portion 28 that is rotatably secured to the first portion 20. The second portion 28 may also be referred to as the upper portion. The second portion 28 of each fixture 18 is configured to rotate about a pitch axis 30 relative to the first portion 20 and relative to the outer or upper surface 26 of the base plate 12. More specifically, the second portion 28 of each fixture 18 may be secured to a respective first portion 20 via a second pivot shaft 32 such that the second portion 28 of each fixture 18 is configured to rotate about a respective pitch axis 30. Each pitch axis 30 that each respective second portion 28 of each fixture 18 is configured to rotate about may be substantially parallel to the outer or upper surface 26 of the base plate 12. Substantially parallel may refer to any incremental value between exactly parallel and 10° from exactly parallel.

The inspection system 10 includes a plurality of light sources 34. Each light source 34 is secured to one of the fixtures 18 of the array of fixtures. Each light source 24 is configured to direct light at a yaw angle, ψ, about the yaw axis 22 of the respective fixture 18 that a specific light source 34 is secured to relative to the center 19 of the base plate 18. The exact center 19 or center point of the base plate 18 may be positioned in the central opening 14. Each light source 24 is configured to direct light away from the base plate 18 at a pitch angle, θ, about the pitch axis 30 of the respective fixture 18 that a specific light source 34 is secured relative to the outer or upper surface 26 of the base plate 12. The light sources 34 may be any type of light source, including but not limited to, a red light source, a blue light source, a green light source, an infrared light source, an ultraviolet light source, or any combination thereof. The light sources maybe light emitting diodes (LEDs), lasers, incandescent lights, or any other type of light known in the art.

The inspection system 10 includes a drive mechanism that is configured to adjust the positions the first portions 20 and the second portions 28 of each fixture to adjust the yaw angles, ψ, and the pitch angles, θ, at which each of the light sources 34 is directed. The drive mechanism is configured to rotate the first portions 20 of each fixture 18 about each respective yaw axis 22 to adjust the yaw angles, ψ, at which each light source 34 directs light relative to the center 19 or relative to the central opening 14 of the base plate 18. The drive mechanism is also configured to rotate the second portions 28 of each fixture 18 about each respective pitch axis 30 to adjust the pitch angles, θ, at which each light source 34 directs light away from the base plate 12 relative to the outer or upper surface 26 of the base plate 12.

The first portion 20 of each fixture 18 includes a protrusion 36 that extends outward from the base plate 12. The drive mechanism is configured to engage the protrusions 36 of each fixture 18 to rotate the first portions 20 of each fixture about each respective yaw axis 22 to adjust each respective yaw angle, ψ, that each light source 34 directs light relative to the center 19 or relative to the central opening 14 of the base plate 18. More specifically, the drive mechanism includes an outer ring plate 38 that is disposed about the base plate 12 radially outward of each of the fixtures 18. The outer ring plate 38 includes outwardly or upwardly extending posts 40. Pairs of the posts 40 defines slots and the protrusions 36 of the first portions 20 of each fixture 18 extend outward and into a slot that is defined between one of the pairs of the posts 40. Upon rotation of the outer ring plate 38 about the center 19 of the base plate 12, and along an axis that may be substantially parallel with the yaw axes 22 that the first portions 20 of the fixtures 18 are configure to rotate about, the posts 40 are configured to engage each protrusion 36 to rotate the first portions 20 of each fixture 18 about each respective yaw axis 22.

The outer ring plate 38 may include gear teeth 42. An actuator 44, such as a servo motor, may be secured to the base plate 12. The actuator 44 may be configured engage the gear teeth 42 on the outer ring plate 38 via one or more gears 46 to rotate the outer ring plate 38 relative to the base plate 12 such that the posts 40 engage each protrusion 36 to rotate the first portions 20 of each fixture 18 about each respective yaw axis 22 to adjust each respective yaw angle, ψ, that each light source 34 directs light relative to the center 19 or relative to the central opening 14 of the base plate 12. Guide blocks 49 may be secured to the base plate 12. The guide blocks 49 may define external slots and a radially inward portion of the outer ring plate 38 may be partially disposed within the external slots defined by the guide blocks 49. The outer ring plate 38 may be configured to slide within the external slots defined by the guide blocks 49 when the outer ring plate 38 is rotated about the center 19 of the base plate 12.

The first portion 20 of each fixture 18 may define one of a plurality of through holes 48. The drive mechanism may include a plurality of posts 50. Each post 50 extends upward through one of the through holes 48 and engages one of the second portions 28 of one of the fixtures 18. The plurality of posts 50 are configured to translate upward or downward to rotate the second portions 28 of each fixture 18 about each respective pitch axis 30 to adjust each respective pitch angle, θ, at which each light source 34 directs light away from the base plate 12 relative to the outer or upper surface 26 of the base plate 12.

The drive mechanism may include a lower plate 52 that is disposed below the base plate 12. Each post 50 may be secured to a lower plate 52. The lower plate 52 may be connected to one or more actuators 54, such as linear servo motors, that are configured to adjust a vertical position of the lower plate 52 to translate each of the plurality of posts 50 upward or downward. The one or more actuators 54 may be secured to the base plate 12 such that activating the one or more actuators 54 produces relative movement between the base plate 12 and the lower plate 52. The second portion 28 of each fixture 18 may also include a biasing element 56 that biases the second portion 28 of each fixture into engagement with one of the plurality of posts 50. The biasing element 56 of each fixture 18 is also configured adjust the position of the second portion 28 of each fixture 18 upon retraction (i.e., the lowering) of the posts 50 such that the pitch angles, θ, at which each light source 34 directs light away from the base plate 12 relative to the outer or upper surface 26 of the base plate 12 decreases.

It should be understood that the drive mechanism described herein is just an example. Any other system that is configured to transfer power from an actuator to the fixtures 18 to adjust the positions of the first portions 20 and the second portions 28 of each fixture 18 in order to adjust the yaw angles, ψ, and the pitch angles, θ, at which each of the light sources 34 are directed should be construed as disclosed herein. Such systems that are configured to transfer power may include gears, linking arms, shafts, etc. For example, small actuators, such electric motors may be directly connected to the first and second pivot shafts to adjust the yaw angles, ψ, and the pitch angles, θ, respectively. As another example, each of the first portions 20 of each fixture 28 may include gear teeth that engage a ring gear or a chain that is connected to an actuator, such as an electric motor, to adjust the yaw angles, ψ.

Figure 3:
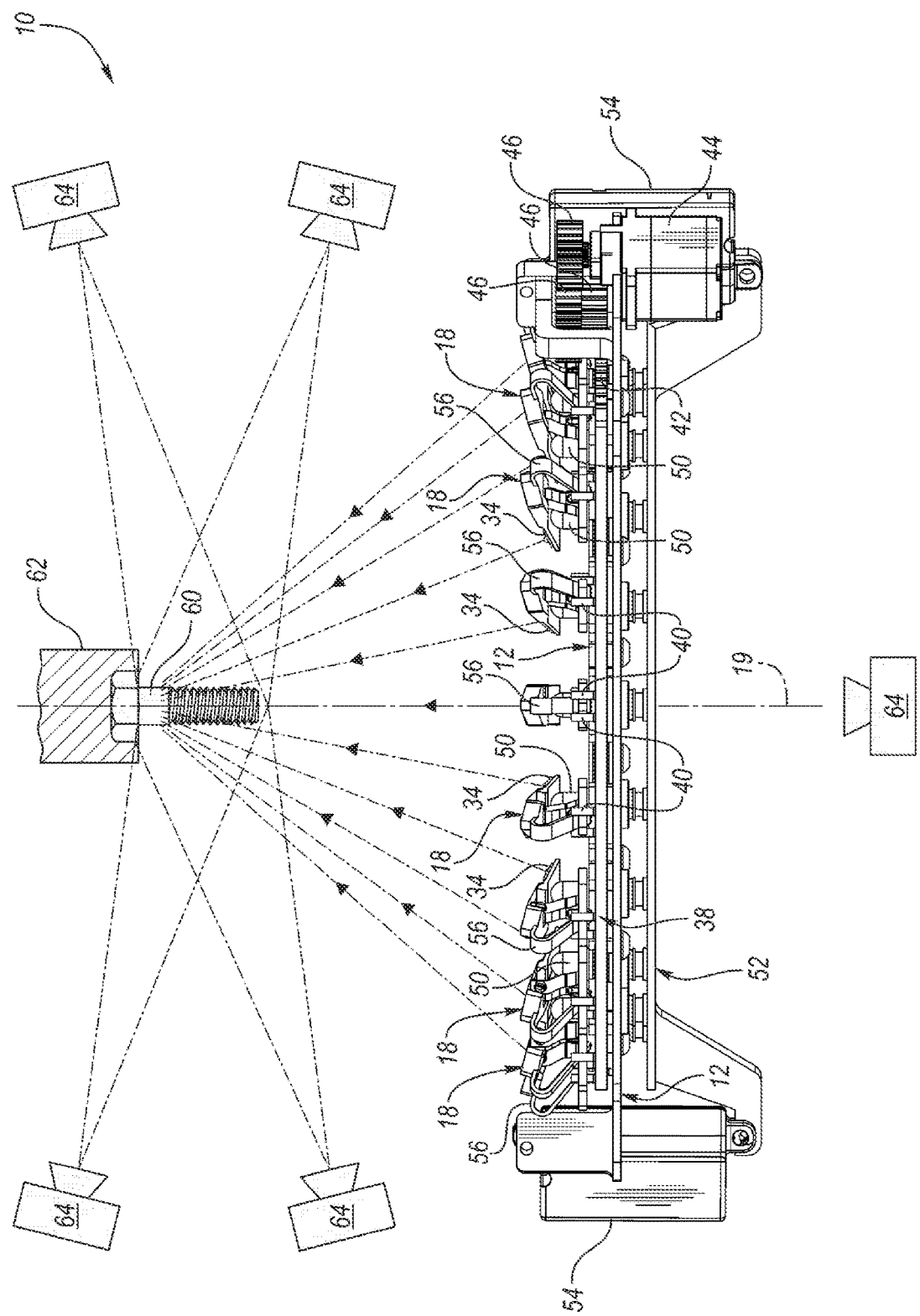
FIG. 3 is a side view of the inspection system for manufactured products or components.
Figure 4:
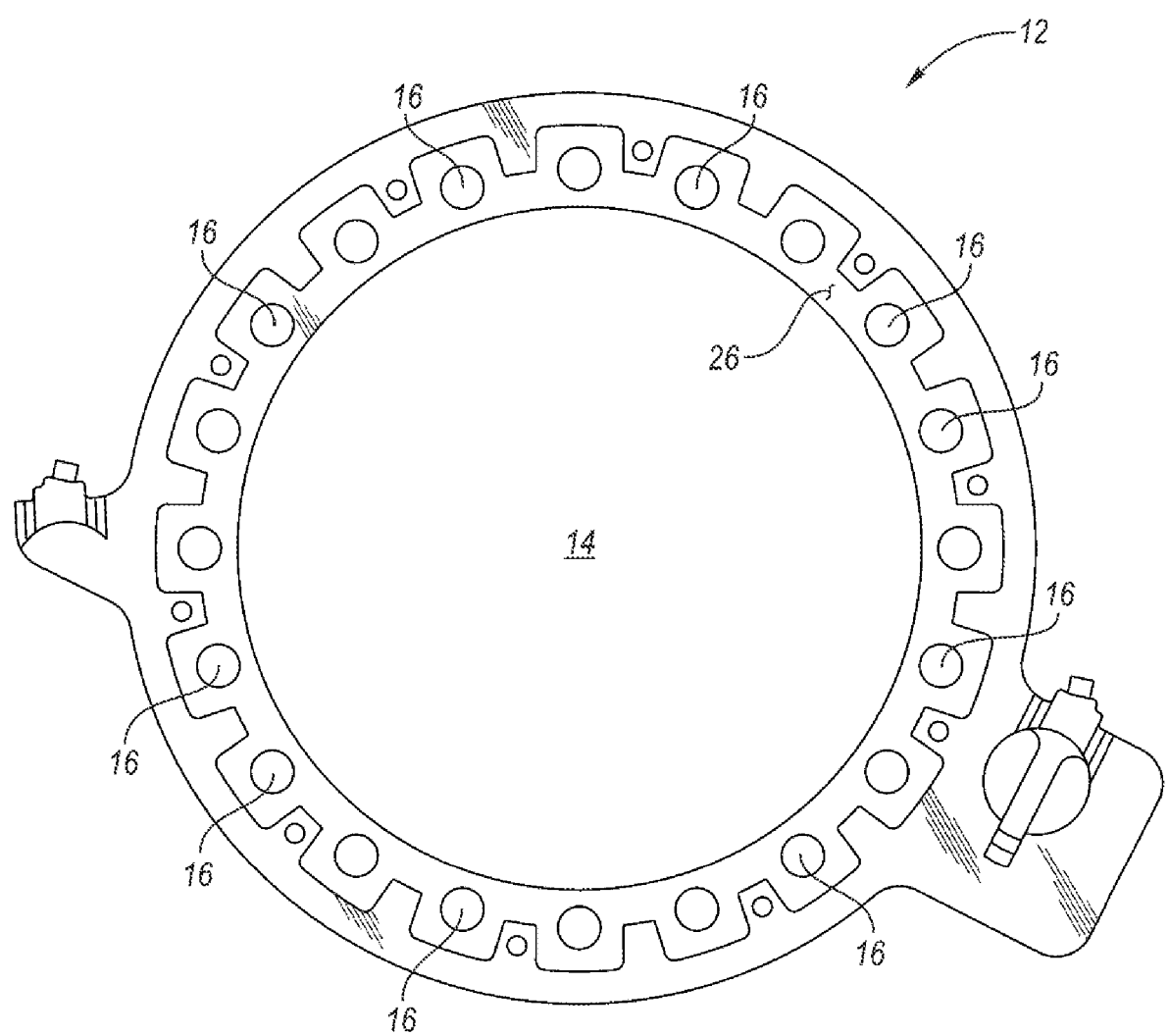
FIG. 4 is a top view of a base plate of the inspection system for manufactured products or components.
Figure 5:
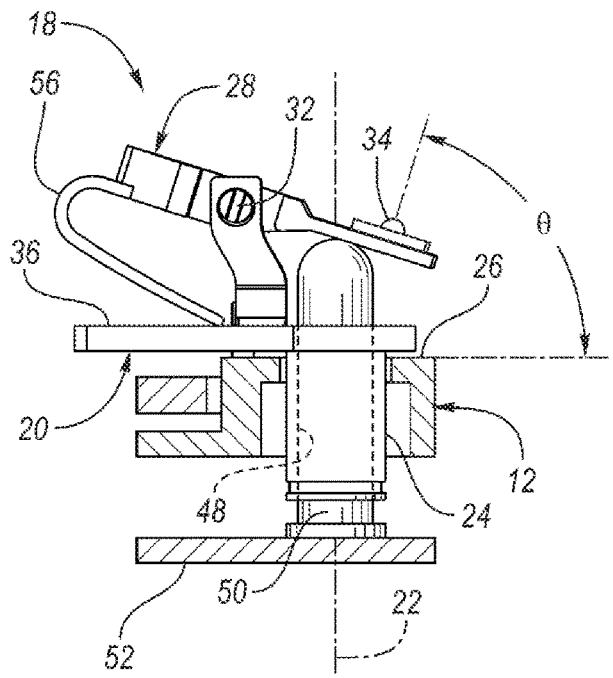
FIG. 5 is an isometric view of a fixture of the inspection system for manufactured products or components.
Figure 6:
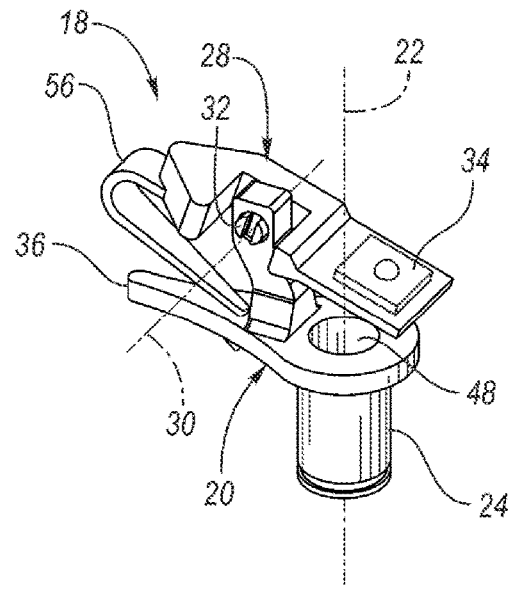
FIG. 6 is a side view of the fixture and a mechanism for adjusting the pitch angle of the fixture of the inspection system for manufactured products or components.

Referring now to FIG. 3, the inspection system 10 may include a conveying system that is configured to transport manufactured products or components 60 into a station that includes the inspection system 10. The manufactured products or components 60 may be secured in place by a chuck 62 or some other device that secures the position of the manufactured products or components 60 within the station.

Alternatively, the manufactured products or components 60 may simply remain on the conveying system, such as a conveyor belt or within a chute of a gravity fed system, while the manufactured products or components 60 are in the station that includes the inspection system 10. If utilizing a conveying system, the components of the conveying system may be transparent so that the light sources 34 may direct light onto the manufactured products or components 60 during an inspection. Such transparent components may be the conveyor itself or a flat surface that the manufactured products or components may rest upon during the inspection. Alternatively, the light sources 34 may be disposed above the manufactured products or components 60 if they are transported into a station that includes the inspection system 10 (i.e., the view illustrated in FIG. 3 may be turned upside down).

The inspection system 10 may include one or more cameras 64 that are configured to record images of the manufactured products or components 60 during an inspection of the manufactured products or components 60. The light sources 34, the cameras 64, the actuators 44, 54, and any other component that is part of the inspection system 10 may be connected to a power source (e.g., a local power grid) and to a controller. The controller may include control logic or an algorithm that is configured to detect defects (described above) in the manufactured products or components 60 being inspected. The control logic or an algorithm may also be configured to operate the actuators 44, 54 to adjust the to adjust the yaw angles, ψ, and the pitch angles, θ, over a range during the inspection to ensure that any defects in the manufactured products or components 60 are illuminated during the inspection process. The control logic or algorithm may then make a determination if any detected defects are within a tolerable range. If any detected defects are within a tolerable range, the manufactured products or components 60 may be passed for consumer use. If any detected defects are not within a tolerable range, the manufactured products or components 60 may be transported to a rejected product storage bin.

Defect detection may be conducted by running several image processing algorithms within the controller and then analyzing the resultant pixel brightness values. Groups of pixels whose brightness values exceed a preset threshold are flagged as a "bright defect," while groups of pixels whose brightness values lie below a preset threshold are flagged as a "dark defect." Different image processing techniques and threshold values are often needed to inspect for bright and dark defects on the manufactured products or components or within a region of the manufactured products or components. Such imaging techniques to detect defects on manufactured products or components are disclosed in U.S. Pat. No. 9,575,013, the disclosure of which is hereby incorporated in its entirety by reference herein.

The controller may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the inspection system 10.

Figure 7:
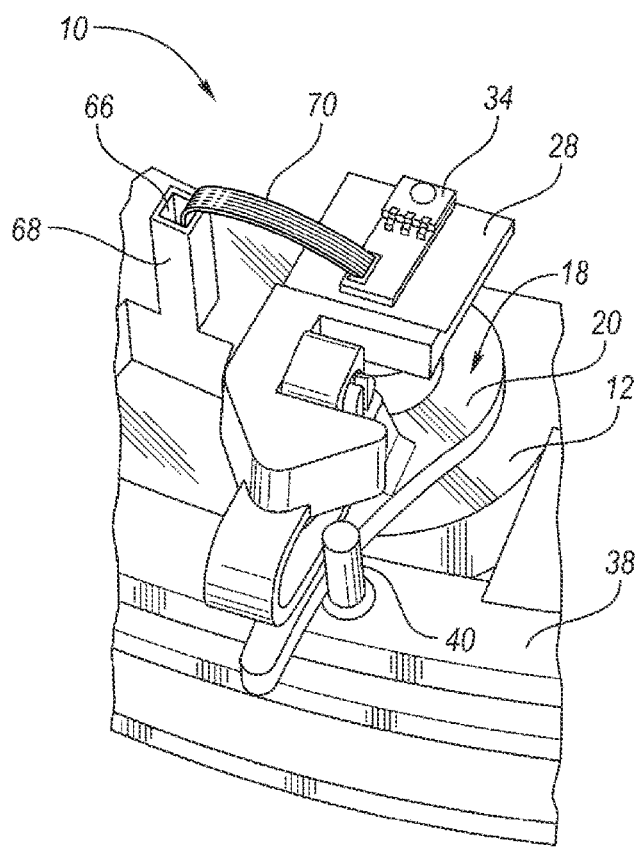
FIG. 7 is an isometric view of the fixture illustrating a wiring system utilized by the inspection system for manufactured products or components.

Referring to FIG. 7, an isometric view of one of the fixtures 18 illustrating a wiring system that may be utilized by the inspection system 10 to connect each of the light sources 34 to the power source (e.g., a local power grid) and the controller. The base plate 12 may define a plurality of orifices 66. More specifically, the plurality of orifices 66 may be defined by a plurality of posts 68 that protrude upward from the base plate 12. One of a plurality of flexible circuit boards 70 may be configured to connect each light source or any other electrical device (e.g., a sensor or camera) to the power source and/or to the controller.

Figure 8:
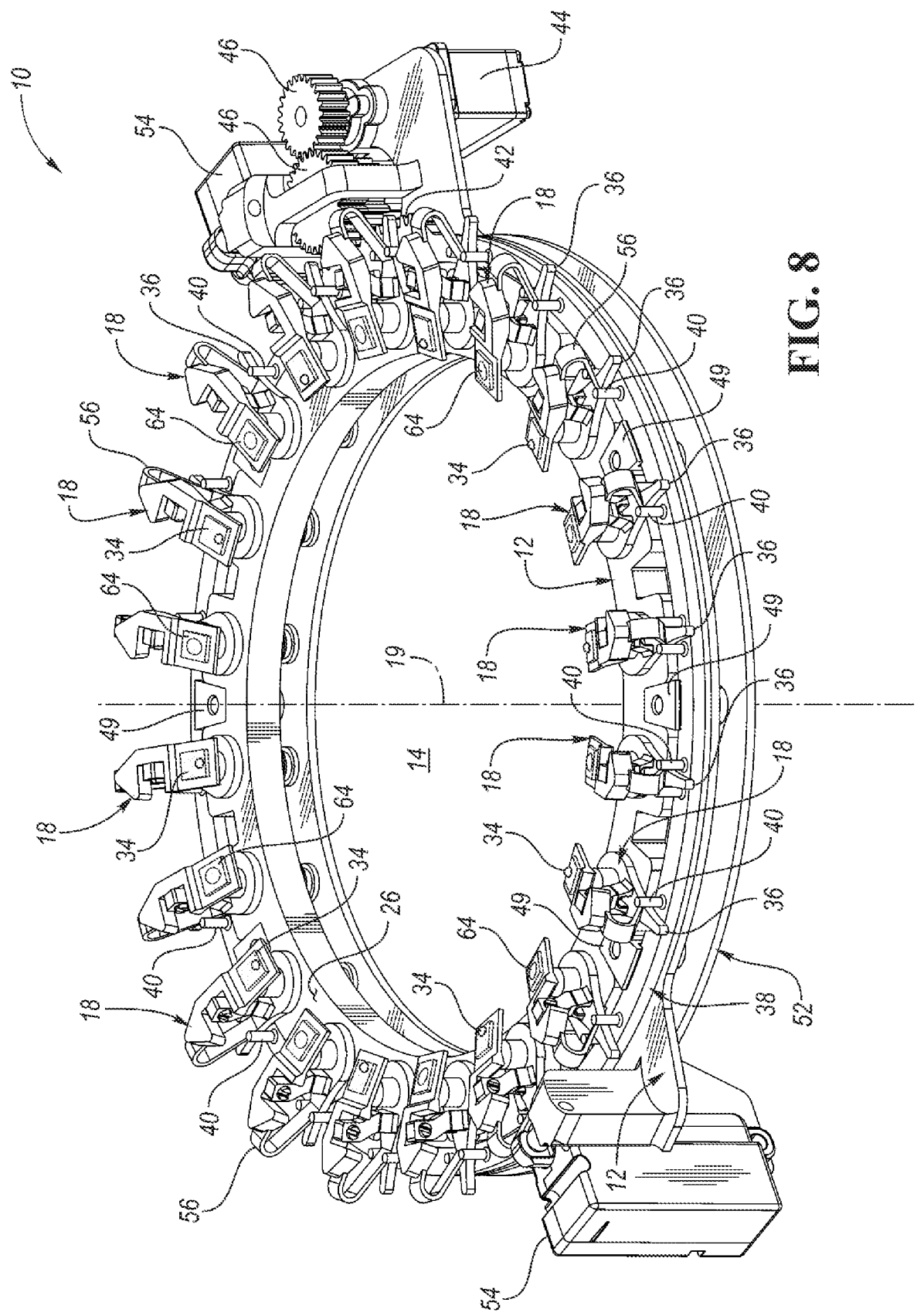
FIG. 8 is an isometric view of an alternative embodiment of the inspection system for manufactured products or components.

Referring to FIG. 8, an isometric view of an alternative embodiment of the inspection system 10' for manufactured products or components is illustrated. Unless otherwise described herein, the alternative embodiment of the inspection system 10' should be construed to include all of the components and functionality of the inspection system 10 described above in FIGS. 1-7. The differences between the alternative embodiment of the inspection system 10' and inspection system 10 is that the cameras 64 have been disposed on one or more of the fixtures 18. More specifically, the cameras 64 have been disposed on the second portions 28 of one or more of the fixtures 18.

The cameras may be secured to two or more of the fixtures 18 and may be equally spaced apart radially relative to the base plate 12. In the embodiment depicted in FIG. 8, a camera 64 is disposed on every other fixture 18 while a light source 34 is disposed on every other fixture. Under such a configuration the array of fixtures 18 may be referred to as first and second arrays of interleaved fixtures where a light source 34 is secured to each fixture of the first array of fixtures and a camera 64 is secured to each fixture of the second array of fixtures. Each light source 34 may be directed and each camera 64 may be focused toward a position of the manufactured product or component, similar to what is depicted in FIG. 3. The drive mechanism is configured to adjust the yaw angles, ψ, and the pitch angles, θ, at which both the light sources 34 and the cameras 64 are directed relative to the center 19 of the base plate 12 and the outer surface 26 of the base plate 12, respectively, during an inspection of a manufactured product or component.

The alternative embodiment of the inspection system 10' may also be connected to a power source and a controller. The alternative embodiment of the inspection system 10' may be configured to detect defects during an inspection in a similar manner as described above with respect to inspection system 10. The control logic or an algorithm may also be configured to operate the actuators 44, 54 to adjust the to adjust the yaw angles, ψ, and the pitch angles, θ, of both the light sources 34 and the cameras 64 over a range during the inspection to ensure that any defects in the manufactured products or components are illuminated and to ensure the cameras 64 are oriented over a range of angles to detect any defects during the inspection process.

Alternatively, sensors that include both a light source (or emitter) and a receiver may be secured to the fixtures 18 and may be configured to perform a sweep over a range of yaw angles, v, and pitch angles, θ, during the inspection process to ensure that any defects in the manufactured products or components are detected. Such types of sensors that include a light source (or emitter) and a receiver may use triangulation to detect surface features and any defects in the surface features of manufactured products or components. Such types of sensors that include a light source (or emitter) and a receiver that may use triangulation to detect surface features and any defects in the surface features are disclosed in U.S. Pat. No. 9,575,013, the disclosure of which is hereby incorporated in its entirety by reference herein.

It should be understood that the designations of first, second, third, fourth, etc. for any components, states, or conditions described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. An inspection system comprising:
   a base plate;
   an array of fixtures arranged radially about a center of the base plate, each fixture having a first portion rotatably secured to the base plate and configured to rotate about a yaw axis and a second portion rotatably secured to the first portion and configured to rotate about a pitch axis;
   a plurality of light sources, each light source secured to one of the fixtures in the array of fixtures and configured to direct light at a yaw angle about the yaw axis of the respective fixture relative to the center of the base plate and away from the base plate at a pitch angle about the pitch axis of the respective fixture relative to an outer surface of the base plate; and
   a drive mechanism configured to,
      rotate the first portions of each fixture about each respective yaw axis to adjust the yaw angle at which each light source directs light relative to the center of the base plate, and rotate the second portions of each fixture about each respective pitch axis to adjust the pitch angle at which each light source directs light away from the base plate relative to the outer surface of the base plate.

2. The inspection system of claim 1, wherein the first portion of each fixture includes a protrusion that extends outward from the base plate, and wherein the drive mechanism is configured to engage the protrusion of each fixture to rotate the first portions of each fixture about each respective yaw axis to adjust each respective yaw angle.

3. The inspection system of claim 2, wherein the drive mechanism includes an outer ring plate that is disposed about the base plate, the outer ring plate having outwardly extending posts that are configured to engage each protrusion to rotate the first portions of each fixture about each respective yaw axis upon rotation of the outer ring plate.

4. The inspection system of claim 3 further comprising an actuator, and wherein the outer ring plate includes gear teeth and the actuator is configured engage the gear teeth via one or more gears to rotate the outer ring plate relative to the base plate.

5. The inspection system of claim 1, wherein the first portion of each fixture defines one of a plurality of through holes and the drive mechanism includes a plurality of posts, each post extending upward through one of the through holes and engaging one of the second portions of one of the fixtures, and wherein the plurality of posts are configured to translate upward or downward to rotate the second portions of each fixture about each respective pitch axis to adjust each respective pitch angle.

6. The inspection system of claim 5, wherein the drive mechanism includes a lower plate that is disposed below the base plate and each of the plurality of posts are secured to the lower plate.

7. The inspection system of claim 6 further comprising an actuator, and wherein the actuator is configured to adjust a vertical position of the lower plate to simultaneously translate each of the plurality of posts upward or downward.

8. The inspection system of claim 5, wherein the second portion of each fixture includes a biasing element that biases each second portion into engagement with one of the plurality of posts.

9. An inspection system for manufactured components comprising:
a ring-shaped base plate defining a central opening and defining a plurality of orifices arranged radially about the central opening;
an array of fixtures, each fixture having a lower portion and an upper portion, the lower portion of each fixture having a first pivot shaft disposed within one orifice of the plurality of orifices such that the lower portion of each fixture is configured to rotate about a yaw axis, the upper portion of each fixture rotatably secured to the lower portion via a second pivot shaft such that the lower portion rotates about a pitch axis;
a plurality of light sources, each light source secured to one of the fixtures and configured to direct light at a yaw angle about the yaw axis of the respective fixture relative to the central opening and away from the ring-shaped base plate at a pitch angle about the pitch axis of the respective fixture relative to an upper surface of the ring-shaped base plate; and
a drive mechanism configured to,
rotate the lower portions of each fixture about each respective yaw axis to adjust the yaw angle at which each light source directs light relative to the central opening, and
rotate the upper portions of each fixture about each respective pitch axis to adjust the pitch angle at which each light source directs light away from the ring-shaped base plate relative to the upper surface of the ring-shaped base plate.

10. The inspection system of claim 9, wherein the lower portion of each fixture includes a protrusion that extends outward from the base plate, and wherein the drive mechanism is configured to engage the protrusion of each fixture to rotate the lower portions of each fixture about each respective yaw axis to adjust each respective yaw angle.

11. The inspection system of claim 10, wherein the drive mechanism includes an outer ring plate that is disposed about the ring-shaped base plate, the outer ring plate having upwardly extending posts that are configured to engage each protrusion to rotate the lower portions of each fixture about each respective yaw axis upon rotation of the outer ring plate.

12. The inspection system of claim 11 further comprising an actuator, and wherein the outer ring plate includes gear teeth and the actuator is configured to engage the gear teeth via one or more gears to rotate the outer ring plate relative to the ring-shaped base plate.

13. The inspection system of claim 9, wherein the lower portion of each fixture defines one of a plurality of through holes and the drive mechanism includes a plurality of posts, each post extending upward through one of the through holes and engaging one of the upper portions of one of the fixtures, and wherein the plurality of posts are configured to translate upward or downward to rotate the upper portions of each fixture about each respective pitch axis to adjust each respective pitch angle.

14. The inspection system of claim 13, wherein the drive mechanism includes a lower plate that is disposed below the base plate and each of the plurality of posts are secured to the lower plate.

15. The inspection system of claim 14 further comprising an actuator, and wherein, wherein the actuator is configured to adjust a position of the lower plate towards or away from the ring-shaped base plate to simultaneously translate each of the plurality of posts upward or downward.

16. The inspection system of claim 13, wherein the upper portion of each fixture includes a biasing element that biases each upper portion into engagement with one of the plurality of posts.

17. An inspection system for manufactured components comprising:
a base plate;
first and second arrays of fixtures interleaved relative to each other and arranged radially about a center of the base plate, each fixture of the first and second arrays having a first portion rotatably secured to the base plate and configured to rotate about a yaw axis and a second portion rotatably secured to the first portion and configured to rotate about a pitch axis;
a plurality of light sources, each light source secured to one of the fixtures of the first array of fixtures and configured to direct light at a first yaw angle about the yaw axis of the respective fixture relative to the center of the base plate and away from the base plate at a first pitch angle about the pitch axis of the respective fixture relative to an outer surface of the base plate;

a plurality of cameras, each camera secured to one of the fixtures of the second array of fixtures and directed at a second yaw angle about the yaw axis of the respective fixture relative to the center of the base plate and away from the base plate at a second pitch angle about the pitch axis of the respective fixture relative to the outer surface of the base plate; and a drive mechanism configured to, rotate the first portions of each fixture of the first array of fixtures about each respective yaw axis to adjust the first yaw angle at which each light source directs light relative to the center of the base plate, rotate the second portions of each fixture of the first array of fixtures about each respective pitch axis to adjust the first pitch angle at which each light source directs light away from the base plate relative to the outer surface of the base plate, rotate the first portions of each fixture of the second array of fixtures about each respective yaw axis to adjust the second yaw angle at which each camera is directed relative to the center of the base plate, and rotate the second portions of each fixture of the second array of fixtures about each respective pitch axis to adjust the second pitch angle at which each camera is directed away from the base plate relative to the outer surface of the base plate.

18. The inspection system of claim 17, wherein the first portion of each fixture of the first and second array of fixtures includes a protrusion that extends outward from the base plate, and wherein the drive mechanism includes an outer ring plate that is disposed about the base plate, the outer ring plate having upwardly extending posts that are configured to engage each protrusion to rotate the first portions of each fixture about each respective yaw axis upon rotation of the outer ring plate.

19. The inspection system of claim 17, wherein the first portion of each fixture defines one of a plurality of through holes and the drive mechanism includes a plurality of posts, each post extending upward through one of the through holes and engaging one of the second portions of one of the fixtures, and wherein the plurality of posts are configured to translate upward or downward to rotate the second portions of each fixture about each respective pitch axis.

20. The inspection system of claim 19, wherein the drive mechanism includes a lower plate that is disposed below the base plate and each of the plurality of posts are secured to the lower plate.

\* \* \* \* \*

UNITED STATES PATENT AND TRADEMARK OFFICE
CERTIFICATE OF CORRECTION

| | | |
|---|---|---|
| PATENT NO. | : 11,099,119 B1 | Page 1 of 1 |
| APPLICATION NO. | : 16/940928 | |
| DATED | : August 24, 2021 | |
| INVENTOR(S) | : Greg Nygaard et al. | |

It is certified that error appears in the above-identified patent and that said Letters Patent is hereby corrected as shown below:

In the Claims

Column 10, Line 42-43, Claim 15:
After "comprising an actuator,"
Delete "and wherein,"

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*